United States Patent [19]

Taga et al.

[11] Patent Number: 4,957,719

[45] Date of Patent: Sep. 18, 1990

[54] PROCESS FOR PREPARATION OF SYNTHETIC MAZZITE

[75] Inventors: Toshiyuki Taga; Senshi Kasahara, both of Shinnanyo, Japan

[73] Assignee: Tosoh Corporation, Shinnanyo, Japan

[21] Appl. No.: 332,422

[22] Filed: Mar. 31, 1989

Related U.S. Application Data

[63] Continuation of Ser. No. 138,053, Dec. 28, 1987, abandoned.

[30] Foreign Application Priority Data

Dec. 26, 1986 [JP] Japan ............................. 61-308889

[51] Int. Cl.$^5$ ............................................. C01B 33/28
[52] U.S. Cl. .................................................. 423/328
[58] Field of Search ....................... 423/328, 329, 326; 502/60, 62, 64

[56] References Cited

U.S. PATENT DOCUMENTS

| | | | |
|---|---|---|---|
| 3,578,723 | 5/1971 | Bowes et al. | 423/328 |
| 3,642,434 | 2/1972 | Dwyer | 423/329 |
| 3,923,639 | 12/1975 | Ciric | 208/111 |
| 3,947,482 | 3/1976 | Albers et al. | 502/62 |
| 4,021,447 | 5/1977 | Rubin et al. | 428/329 |
| 4,241,036 | 12/1980 | Flanigen et al. | 423/329 |
| 4,587,115 | 5/1986 | Arika et al. | 423/329 |
| 4,608,236 | 8/1986 | Strack et al. | 423/328 |
| 4,631,262 | 12/1986 | Altomare | 423/328 |
| 4,678,651 | 7/1987 | Miyazaki et al. | 423/328 |
| 4,724,067 | 2/1988 | Raatz et al. | 502/64 |

FOREIGN PATENT DOCUMENTS

| | | | |
|---|---|---|---|
| 46-27377 | 8/1971 | Japan . | |
| 1117568 | 6/1968 | United Kingdom . | |
| 1178186 | 1/1970 | United Kingdom . | |
| 1297256 | 11/1972 | United Kingdom | 423/328 |

*Primary Examiner*—John Doll
*Assistant Examiner*—R. Bruce Breneman
*Attorney, Agent, or Firm*—Cushman, Darby & Cushman

[57] ABSTRACT

Synthetic mazzite having a small particle size is advantageously prepared by making present a transparent liquid phase compound in a starting mixture containing a silica source, an alumina source, an alkali source and a tetramethylammonium source.

The transparent liquid phase compound is obtained by mixing an aqueous solutuion of an alkali metal silicate, an aqueous solution of an alkali metal aluminate, an aqueous solution of an alkali metal hydroxide and a tetramethylammonium compound and aging the mixture.

3 Claims, 3 Drawing Sheets

X 42000

0.2μ

X 10000    ⊢—⊣
            1μ

PROCESS FOR PREPARATION OF SYNTHETIC MAZZITE

This is a continuation of Application No. 07/138,053, filed Dec. 27, 1987, which was abandoned upon the filing hereof.

BACKGROUND OF THE INVENTION (1) Field of the Invention

The present invention provides a process for the preparation of synthetic mazzite having a small primary particle size.

(2) Description of the Related Art

Mazzite is a kind of natural zeolite, and is structurally characterized in that it consists essentially of gemlinite units and is crosslinked with oxygen 12-membered rings perpendicularly to the C-axis and channels of the 12-membered rings are isolated by walls consisting of alternating ladders of 4-membered and 5-membered rings. The one-dimensional cylindrical channel has 12-membered rings having a minimum free diameter of 7.2 Å, 0(6) to 0(6). It is considered that, among zeolites having oxygen 12-membered rings, mazzite has the largest kinetic diameter. Accordingly, mazzite having large pores can be used as an adsorbent, a product stabilized by an aluminum-removing treatment of mazzite, as ultra-stabilized Y-type zeolite, can be used as a cracking catalyst for heavy oils, and a product obtained by an ion-exchange treatment of mazzite can be used as an adsorbent for gas separation. Accordingly, a synthesis of mazzite at a low cost on an industrial scale is desired.

The main uses of zeolites are a dehydrating agent, an adsorbent for gas separation, and a catalyst. Where a zeolite is used as a catalyst, not only the selectivity of a target product but also the life of the catalyst is important. Of course, the longer the life of the catalyst, the longer the application time before regeneration or refilling of the catalyst, and a catalyst having a long life is preferred from the practical viewpoint. It is considered that, as primary particles of a zeolite are small, little coking occurs and the catalyst life is generally prolonged. Accordingly, if a zeolite is used as a catalyst, the primary particle size must be small.

Synthetic zeolites having a structure similar to that of mazzite, that is, synthetic mazzites, which are available at the present, are classified into two types, i.e., ZSM-4 and zeolite Ω. A tetramethylammonium (TMA) compound is used as the template for the synthesis of each of these synthetic zeolites. The process for the preparation of ZSM-4 is disclosed in Japanese Examined Patent Publication No. 46-27,377. In the examples of this patent publication, the smallest primary particle size is 1 to 2 μm. The process for the preparation of zeolite Ω is disclosed in the specification of British Patent No. 1,178,186. In the examples, the primary particle size is not disclosed, but the tetramethylammonium compound is used in a large amount.

Namely, a process is not been known for preparing mazzite having a small primary particle size by using a reduced amount of a tetramethylammonium compound.

The silicon, aluminum, and alkali sources are easily available at low cost from sodium silicate or white carbon, sodium aluminate or aluminum sulfate and sodium hydroxide, respectively. On the other hand, a halide and hydroxide of tetramethylammonium are expensive compared with other compounds. Accordingly, a reduction of the amount used of the tetramethylammonium compound will make it possible to prepare synthetic mazzite economically advantageously, and thus we considered that a clarification of the role of tetramethylammonium in the crystallization of synthetic mazzite would result in a reduction of the amount used of tetramethylammonium.

In mazzite, two gmelinite cages are present per unit cell. Synthetic mazzite cannot be synthesized without using a tetramethylammonium compound, and it is considered that one molecule of tetramethylammonium used for the synthesis is present in the gmelinite cage. Therefore, it is deemed that if all of the tetramethylammonium used for the synthesis is included in gmelinite cages of the crystal, the amount used of the tetramethylammonium compound will be reduced. The present invention is based on this assumption.

SUMMARY OF THE INVENTION

In accordance with the present invention, there is provided a process for the preparation of synthetic mazzite, which comprises crystallizing under heating a starting mixture containing a silica source, an alumina source, an alkali source and a tetramethylammonium source, wherein a transparent liquid phase substance obtained by mixing an aqueous solution of an alkali metal silicate, an aqueous solution of an alkali metal aluminate, an aqueous solution of an alkali metal hydroxide and a tetramethylammonium compound and aging the mixture is made present in the starting mixture in advance.

In the transparent liquid phase substance, an aluminosilicate is formed around the tetramethylammonium ion with a certain regularity of arrangement, and this aluminosilicate acts as the nucleus for crystallization and tetramethylammonium is included in this nucleus. Accordingly, synthetic mazzite can be prepared with addition of a necessary minimum amount of tetramethylammonium. Furthermore, since this nucleus is very small, primary particles of the formed crystal are very small.

DESCRIPTION OF THE PREFERRED EMBODIMENTS

Figure 1:
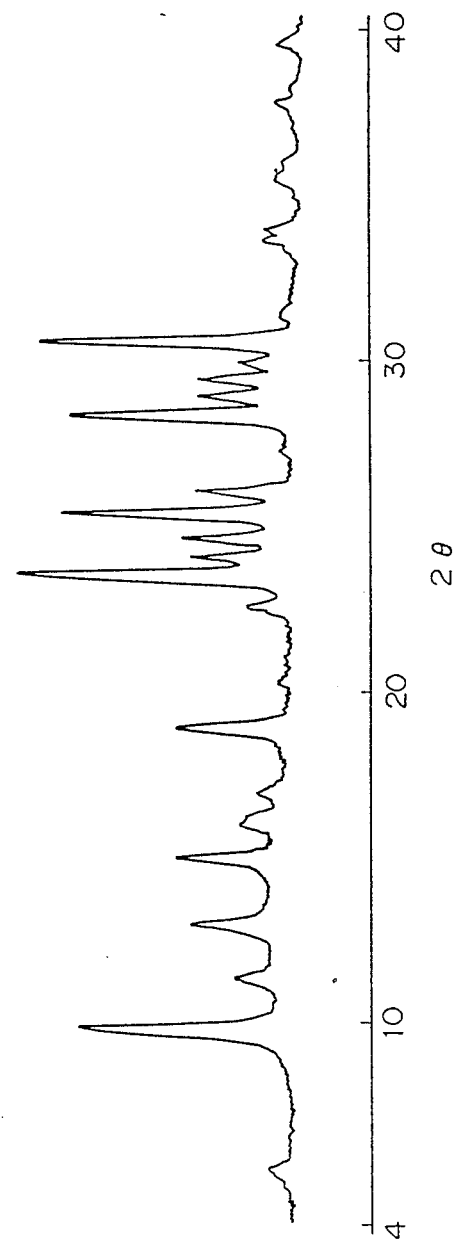
FIG. 1 is an X-ray diffraction pattern diagram of synthetic mazzite obtained in Example 1 by Cu-Kα rays.

The transparent liquid phase substance used in the present invention is composed of an aluminosilicate substance formed by mixing an aqueous solution of an alkali metal silicate, an aqueous solution of an alkali metal aluminate, an aqueous solution of an alkali metal hydroxide, and a tetramethylammonium compound, and aging the mixture, which takes a state similar to a transparent solution, that is, a so-called solubilized state, and the structure of this transparent liquid phase substance is apparently different from the structure of a solid product such as an aqueous gel of an amorphous aluminosilicate formed immediately after mixing a silica source, an alumina source, an alkali source, and a tetramethylammonium source.

By the term "transparent", it is meant that the transmission as determined with respect to transmitted light of 546 nm is at least 50% based on that of pure water. This transparent liquid phase substance can be prepared without formation of a solid substance such as an aluminosilicate gel through the steps of mixing the starting alkali metal silicate, alkali metal aluminate, alkali metal hydroxide, and tetramethylammonium compound, and aging the mixture. If the liquid phase substance is excessively aged, the liquid phase substance is gradually pacified and a gelatinous solid substance not suitable for use in the present invention is formed.

This transparent liquid phase substance is incorporated into a reaction mixture obtained from other silica, alumina, and alkali sources. While the so-obtained starting mixture is heated and a crystal of synthetic mazzite is formed, the transparent liquid phase substance acts as a crystallization-inducing agent, whereby formation of the crystal is promoted, and synthetic mazzite having small primary particles is formed.

The transparent liquid phase substance is prepared according to the following process.

Preferably, the composition of the liquid phase substance is expressed by the following oxide molar ratios:

| | |
|---|---|
| $SiO_2/Al_2O_3 =$ | 8 to 25, |
| $M_2O/Al_2O_3 =$ | 7 to 30, |
| $H_2O/M_2O =$ | 10 to 14, and |
| $TMA/SiO_2 =$ | 0.05 to 0.25, | in which M stands for an alkali metal cation and TMA stands for a tetramethylammonium ion (the same will apply hereinafter).

As the starting aqueous solution of the alkali metal silicate, there are preferably used aqueous solutions of sodium silicate, potassium silicate and lithium silicate, and as the aqueous solution of the alkali metal aluminate, there is preferably used an aqueous solution of sodium aluminate. As such aqueous solutions, commercially available aqueous solutions of alkali metal silicates and alkali metal aluminates and an aqueous solution formed by dissolving with an alkali metal hydroxide a silica source such as siliceous sand or hydrous solid silica acid or an aluminum source such as aluminum hydroxide or active alumina can be used in the present invention, although the aqueous solutions are not limited to those mentioned above.

An aqueous solution of sodium hydroxide can be used as the aqueous solution of the alkali metal hydroxide.

As the tetramethylammonium compound, there are used halides and hydroxide of tetramethylammonium.

The order of addition and mixing of the starting materials is not particularly critical. However, preferably a method is adopted in which the alkali metal hydroxide, the alkali metal aluminate and the tetramethylammonium compound are mixed in advance, and then the aqueous solution of the alkali metal silicate is added in a short time. If the order of addition of the silica source and the alumina source is reversed or if the time of addition of the aqueous solution of the alkali metal silicate is too long, there is a risk of a temporary formation of a gelatinous substance. By aging the formed mixture, a transparent liquid phase substance to be used in the present invention is formed.

If this aging is insufficient, an aluminosilicate, that is, a transparent liquid phase substance, is not formed. On the other hand, if the aging is excessive, a gelatinous substance is formed but a transparent solution is not formed. Preferably, the aging is carried out with stirring. The aging temperature is selected from the range of 25 to 50° C and the aging time is selected from the range of 10 minutes to 2 hours.

The $H_2O/M_2O$ molar ratio in the liquid phase substance is 10 to 14. If the $H_2O/M_2O$ molar ratio is smaller than 10, the transparent state can be maintained but formation of the aluminosilicate is unsatisfactory. If the $H_2O/M_2O$ molar ratio is larger than 14, a gelatinous substance is easily formed at the aging step and a transparent solution is not formed.

The $TMA/SiO_2$ molar ratio in the liquid phase substance is preferably 0.05 to 0.25. If the $TMA/SiO_2$ molar ratio is smaller than 0.05, impurities are easily formed at the synthesis of mazzite, and if the $TMA/SiO_2$ molar ratio is larger than 0.25, primary particles are likely to become large.

After completion of the aging, the liquid phase substance is mixed with the silica source, alumina source, and alkali source (reaction mixture). The amount added of the liquid phase substance is preferably such that the $TMA/SiO_2$ in the starting mixture formed by adding the liquid phase substance to the reaction mixture is 0.02 to 0.04. If the $TMA/SiO_2$ molar ratio is smaller than 0.02, impurities are easily formed, and if the $TMA/SiO_2$ molar ratio is larger than 0.04, primary particles are likely to become large.

The amounts of other components in the starting mixture may be substantially the same as in the conventional process, but the following oxide molar ratios are preferred:

| |
|---|
| $SiO_2/Al_2O_3 = 5$ to 30, |
| $M_2O/Al_2O_3 = 0.5$ to 10, and |
| $H_2O/SiO_2 = 10$ to 40. |

The silica source, alumina source and alkali source of the reaction mixture are not particularly critical, but if an aqueous solution of an alkali metal silicate is used for all of the silica source of the reaction mixture, a method is preferably adopted in which a homogeneous compound of an amorphous aluminosilicate obtained by reacting an aqueous solution of an alkali metal silicate simultaneously and continuously with an aluminum-containing aqueous solution is used as the silica source and alumina source of the reaction mixture. According to this method, since an aluminosilicate homogeneous compound of an optional composition can be easily obtained by adjusting the feed rates of both the aqueous solutions, the composition of synthetic mazzite can be freely set according to the intended $SiO_2/Al_2O_3$ molar ratio.

By the term "simultaneous and continuous reaction" is meant an embodiment in which the aqueous solution of the alkali metal silicate and the aluminum-containing aqueous solution are simultaneously supplied to the reaction zone while always maintaining substantially the same ratio.

As the aqueous solution of the alkali metal silicate, there are preferably used aqueous solutions of sodium silicate, potassium silicate and lithium silicate, and as the aluminum-containing aqueous solution, there are preferably used aqueous solutions of aluminum sulfate, aluminum chloride and sodium aluminate.

According to a preferred embodiment of the method for preparing the amorphous aluminosilicate homogeneous compound (hereinafter referred to as "homogeneous compound"), both the aqueous solutions are simultaneously and continuously supplied to an overflow type reaction tank provided with a stirrer and reacted with stirring. The average residence time should be at least 5 minutes.

The homogeneous compound formed according to this method is composed of substantially spherical particles, and the majority of the particles have a particle size of 1 to 500 μm, and fine particles having a particle size smaller than 1 μm are formed only in a very small amount.

According to another embodiment of the method for preparing the homogeneous compound, a so-called batchwise continuous method is adopted in which both the aqueous solutions are simultaneously and continuously supplied at a certain ratio with stirring to a reaction tank without discharging the reaction slurry. In this embodiment, preferably the necessary amounts of both the aqueous solutions are supplied over a period of at least 10 minutes without adding the aqueous solutions promptly.

The homogeneous compound prepared according to any of the foregoing methods is characterized in that, by simultaneously and continuously reacting both the aqueous solutions having an adjusted concentration at a constant ratio, the composition of the formed homogeneous compound consisting of substantially spherical particles is kept constant and no heterogeneous portion is present. Accordingly, if a reaction mixture for formation of synthetic mazzite is prepared by using this homogeneous compound having a uniform composition and the above-mentioned transparent liquid phase substance is added as the crystallization-inducing agent for synthetic mazzite to this reaction mixture, since no heterogeneous portion is present in the reaction mixture, formation of a crystal is caused at a stroke, and the growth of the crystal is not caused, with the result that a crystal having a small primary particle size is obtained.

The homogeneous compound is used as it is in the form of the as-obtained slurry or the homogeneous compound is once filtered and washed and is formed into a slurry having an optional concentration to obtain a reaction mixture. If necessary, an aqueous solution of an alkali metal hydroxide and/or a neutral salt of an alkali metal may be added to adjust the amount of the alkali metal component in the reaction mixture.

Then, the reaction mixture is mixed with the above-mentioned transparent liquid phase substance aged under predetermined conditions, but the mixing with the liquid phase substance should be completed within a short time, preferably within 10 minutes. If the mixing time is too long, the liquid phase substance is excessively aged during standing, and good results cannot be obtained.

The temperature adopted at the step of mixing the transparent liquid phase substance with the reaction mixture is not particularly critical, and similar results can be obtained at temperatures ranging from room temperature to the crystal-forming temperature. After uniform incorporation of the transparent liquid phase substance, the temperature of the starting mixture is immediately elevated, to effect crystallization.

In the present invention, the crystallization can be performed not only with stirring but also while standing. The crystallization temperature is preferably 90 to 140° C. The crystallization time depends on the crystallization temperature, but is generally 5 to 80 hours.

After completion of the crystallization, the formed crystal is subjected to solid-liquid separation and washing to remove excess alkali component adhering to the crystal, and is then dried, whereby synthetic mazzite having a high purity and a small primary particle size can be easily obtained.

By the process of the present invention, synthetic mazzite having a small primary particle size heretofore desired, for example, an average primary particle size of 0.01 to 0.1 μm, is industrially advantageously obtained.

Synthetic mazzite obtained according to the present invention has a high purity and the $SiO_2/Al_2O_3$ molar ratio can be optionally changed within a broad range. Accordingly, synthetic mazzite obtained according to the present invention can be used for various uses, especially preferably as a catalyst or an adsorbent for gas separation.

The present invention will now be described in detail with reference to the following examples that by no means limit the scope of the invention.

Transparent Liquid Phase Substance Production

Example 1

This example illustrates the process for the preparation of a transparent liquid phase substance.

In a jacketed mixing tank equipped with an ordinary paddle type stirrer, 70.15 g of sodium hydroxide (NaOH =98% by weight) was dissolved in 122.8 g of pure water and the solution was cooled to 30° C., and 41.29 g of sodium aluminate ($Al_2O_3$=19.9% by weight, $Na_2O$=18.8% by weight) was added to the solution. Then, 19.0 g of tetramethylammonium chloride (TMACl=98% by weight) was added to the mixture and the composition was mixed. Then, 165.7 g of an aqueous solution of sodium silicate ($SiO_2$ =29.5% by weight, $Na_2O$=9.44% by weight, $Al_2O_3$=0.02% by weight) was added at a constant rate over a period of 3 minutes and the mixture was aged with stirring at a temperature of 30° C for 30 minutes. During the above aging reaction, opacification did not occur, and a transparent liquid phase substance was obtained. The transmission of the liquid phase substance after completion of the aging was measured at a wavelength of 546 nm by using a spectrophotometer (Model 100-40 supplied by Hitachi). The transmission of the liquid phase substance was 90% based on that of pure water. The composition of the liquid phase substance was characterized by the following oxide molar ratios:

| |
|---|
| $SiO_2/Al_2O_3$ = 10.00, |
| $Na_2/Al_2O_3$ = 15.29, |
| $H_2O/Na_2O$ = 12.00, and |
| $TMA/SiO_2$ = 0.215. |

The liquid phase substance was added to the reaction mixture immediately after completion of the aging.

Homogeneous Compound Production Example 1

An external heating type reaction tank equipped with an ordinary paddle type stirrer was charged with 500 ml of pure water and the temperature was maintained at 40° C.

Then, 4,612 g of an aqueous solution of sodium silicate ($SiO_2$=12.8% by weight, $Na_2O$=5.26% by weight, $Al_2O_3$=0.007% by weight) and 1,301 g of an aqueous solution of aluminum sulfate ($Al_2O_3=7.67\%$ by weight, $H_2SO_4=22.3\%$ by weight) were simultaneously and continuously supplied at certain feed rates to effect reaction. The pH value of the reaction slurry was 7.5.

The slurry product in which the reaction was completed was subjected to centrifugal separation and washed with water until no $SO_4^{2-}$ ion was detected in the washing filtrate. A homogeneous compound having a composition of $Na_2O=3.75\%$ by weight, $Al_2O_3=6.04\%$ by weight and $SiO_2=35.8\%$ by weight on the wet base was obtained.

Example 1

An autoclave equipped with a stirrer was charged with 256.5 g of pure water, and 368.0 g of the homogeneous compound prepared in Homogeneous Compound Production Example 1 was added and the mixture was stirred to prepare a reaction mixture slurry.

Subsequently, 176.3 g of the transparent liquid phase substance prepared in Transparent Liquid Phase Substance Production Example 1 was added to the reaction mixture slurry over a period of 2 minutes.

Then, the temperature of the slurry of the starting mixture in which mixing was completed was elevated, and the slurry was maintained at a temperature of 92° C. with stirring for 72 hours to effect crystallization.

After completion of the crystallization, the product was separated from the mother liquor by filtration, washed with water, and dried at 110° C.

The product was synthetic mazzite having an $SiO_2/Al_2O_3$ molar ratio of 6.70, a crystallization degree of 98%, and a primary particle size of 0.015 to 0.03 μm. Note, the $SiO_2/Al_2O_3$ molar ratio was determined by chemical analysis. The X-ray powder diffraction pattern obtained by using Cu-Kα rays is shown in FIG. 1.

Figure 2:
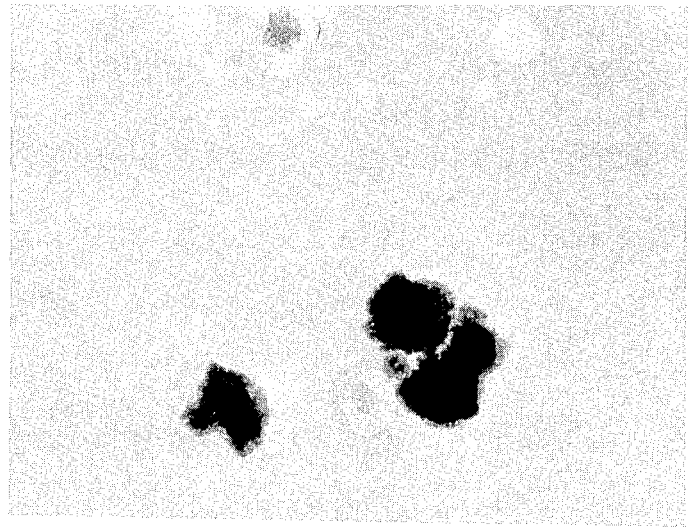
FIG. 2 is a transmission electron microphotograph at a magnification of 42,000 showing the structure of the crystal of synthetic mazzite obtained in Example 2.
Figure 2:

The primary particle size was confirmed by observation under scanning electron microscope and a transmission electron microscope. A photograph at a magnification of 42,000 by the latter microscope is shown in FIG. 2.

Example 2

A dry product was obtained in the same manner as described in Example 1 except that the crystallization was carried out at 100° C. for 64 hours. The product was synthetic mazzite having an $SiO_2/Al_2O_3$ molar ratio of 6.51, a crystallization degree of 100%, and a primary particle size of 0.02 to 0.03 μm.

Example 3

A dry product was obtained in the same manner as described in Example 1 except that the crystallization was carried out at 135° C. for 12 hours. The product was synthetic mazzite having an $SiO_2/Al_2O_3$ molar ratio of 6.36, a crystallization degree of 110%, and a primary particle size of 0.02 to 0.04 μm.

Transparent Liquid Phase Substance Production

Example 2

In the mixing tank used in Transparent Liquid Phase Substance Production Example 1, 74.42 g of sodium hydroxide (NaOH=98% by weight) was dissolved in 131.7 g of pure water and the solution was cooled to 30° C., and 26.4 g of sodium aluminate ($Al_2O_3=19.9\%$ by weight, $Na_2O=18.8\%$ by weight) was added and 19.65 g of tetramethylammonium chloride (TMACl=98% by weight) was further added. The resulting composition was mixed and 165 7 g of aqueous solution of sodium silicate ($SiO_2=29.5\%$ by weight, $Na_2O=9.44\%$ by weight, $Al_2O_3=0.02\%$ by weight) was added at a constant rate over a period of 2 minutes, and the mixture was aged at 30° C. for 30 minutes with stirring. During the aging operation, opacification did not occur, and a transparent liquid phase substance was obtained. The transmission of the liquid phase substance after completion of the aging was determined at a wavelength of 546 nm by using a spectrophotometer (Model 100-40 supplied by Hitachi). It was found that the transmission was 85% based on that of distilled water. The liquid phase substance was characterized by the following molar ratios:

$SiO_2/Al_2O_3 = 16.67$,
$Na_2O/Al_2O_3 = 25.50$,
$H_2O/Na_2O = 12.96$, and
$TMA/SiO_2 = 0.220$.

The liquid phase substance was added to the reaction mixture immediately after completion of the aging.

Homogeneous Compound Production Example 2

The procedures of Homogeneous Compound Production Example 1 were repeated in the same manner except that 4,612 g of an aqueous solution of sodium silicate ($SiO_2=13.0\%$ by weight, $Na_2O=4.15\%$ by weight, $Al_2O_3=0.007\%$ by weight) and 1,215 g of an aqueous solution of aluminum sulfate ($Al_2O_3=4.90\%$ by weight, $H_2SO_4=20.2\%$ by weight) were used.

A homogeneous compound having a composition of $Na_2O=2.50\%$ by weight, $Al_2O_3=3.99\%$ by weight, and $SiO_2=40.0\%$ by weight on the wet base was obtained.

Example 4

An autoclave equipped with a stirrer was charged with 258.2 g of pure water, and 3.13 g of sodium hydroxide (NaOH=98% by weight) and 337.9 g of the homogeneous compound prepared in Homogeneous Compound Production Example 2 were added and the mixture was stirred to prepare a reaction mixture slurry.

Subsequently, 210.6 g of the transparent liquid phase substance prepared in Transparent Liquid Phase Substance Production Example 2 was added to the reaction mixture slurry over a period of 2 minutes.

Then, the temperature of the starting slurry for crystallization, in which the mixing was completed, was elevated, and the slurry was maintained at 100° C. with stirring for 64 hours to effect crystallization.

After completion of the crystallization, the product was separated from the mother liquor by filtration, washed with water, and dried at 110° C.

The product was synthetic mazzite having an $SiO_2/Al_2O_3$ molar ratio of 8.21, a crystallization degree of 100%, and a primary particle size of 0.02 to 0.03 μm.

Example 5

A dry product was prepared in the same manner as described in Example 4 except that 255.6 g of pure water, 18.86 g of sodium hydroxide (NaOH=98% by weight), 332.8 g of the homogeneous compound and 207.5 g of the transparent liquid phase substance were used.

The product was synthetic mazzite having an SiO$_2$/Al$_2$O$_3$ molar ratio of 7.56, a crystallization degree of 100%, and a primary particle size of 0.02 to 0.03 μm.

Homogeneous Compound Production Example 3

The procedures of Homogeneous Compound Production Example 1 were repeated in the same manner except that 4,612 g of an aqueous solution of sodium silicate (SiO$_2$=13.0% by weight, Na$_2$O=4.15% by weight, Al$_2$O$_3$=0.007% by weight) and 1,196 g of an aqueous solution of aluminum sulfate (Al$_2$O$_3$=3.67% by weight, H$_2$SO$_4$=21.8% by weight) were used.

A homogeneous compound having a composition of Na$_2$O=2.33% by weight, Al$_2$O$_3$=3.48% by weight, and SiO$_2$ of 49.0% by weight on the wet base was obtained.

Example 6

A dry product was obtained in the same manner as described in Example 4 except that 328.2 g of pure water, 40.79 g of sodium hydroxide (NaOH=98% by weight), 283.9 g of the homogeneous compound prepared in Homogeneous Compound Production Example 3 and 157.1 g of the transparent liquid phase substance were used.

The product was synthetic mazzite having an SiO$_2$/Al$_2$O$_3$ molar ratio of 7.43, a crystallization degree of 100%, and a primary particle size of 0.02 to 0.03 μm.

Comparative Example 1

A dry product was prepared in the same manner as described in Example 1 except that the transparent liquid phase substance was not added. The product was zeolite U.

Comparative Example 2

A dry product was prepared in the same manner as described in Example 1 except that 175.5 g of a transparent liquid phase substance obtained in the same manner as described in Transparent Liquid Phase Substance Production Example 1 without adding tetramethylammonium chloride was used as the transparent liquid phase substance.

The product was faujasite type zeolite having an SiO$_2$/Al$_2$O$_3$ molar ratio of 5.45.

Comparative Example 3

A dry product was prepared in the same manner as described in Example 1 except that 175.5 g of a transparent liquid phase substance obtained in the same manner as described in Transparent Liquid Phase Substance Production Example 1 without addition of tetramethylammonium chloride was used as the transparent liquid phase substance and 8.46 g of tetramethylammonium chloride was added at the step of preparing the reaction mixture.

The product was synthetic mazzite having a crystallization degree of 70%, in which faujasite type zeolite simultaneously formed was contained.

Example 7

A dry product was prepared in the same manner as described in Example 1 except that the crystallization was carried out at a temperature of 150° C. for 24 hours.

Figure 3:
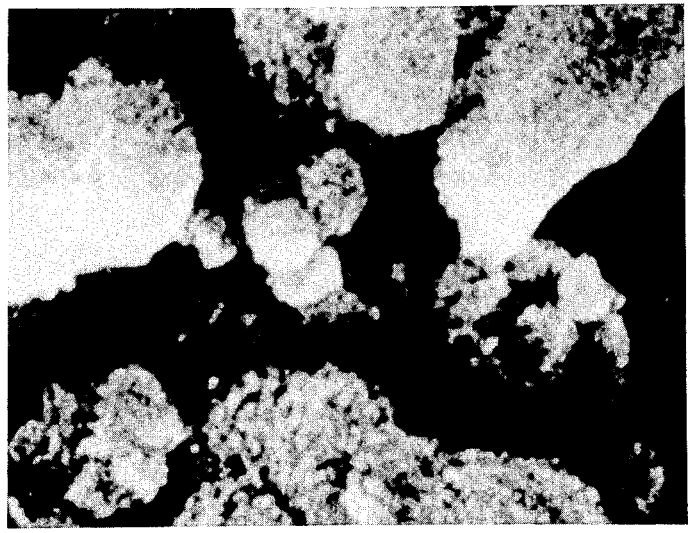
FIG. 3 is a scanning electron microphotograph at a magnification of 10,000 showing the structure of the crystal of synthetic mazzite obtained in Example 7.

The product was synthetic mazzite having an SiO$_2$/Al$_2$O$_3$ molar ratio of 6.45 and a crystallization degree of 115%. Note, the primary particles were needles having a size of 0.1 μm×0.1 μm×1 μm. A photograph at a magnification of 10,000 by a scanning electron microscope is shown in FIG. 3.

We claim:

1. A process for the preparation of synthetic mazzite which comprises the steps of:
   a. preparing a mixture of an aqueous solution of an alkali metal silicate, an aqueous solution of an alkali metal aluminate, an aqueous solution of an alkali metal hydroxide and a tetramethylammonium compound;
   b. heating and aging said mixture at a temperature of 25 to 50° C.;
   c. stirring said mixture for a period of time such that a transparent liquid phase substance is formed, said transparent liquid phase substance comprising the following oxide molar ratios:

| | |
|---|---|
| SiO$_2$/Al$_2$O$_3$ = | 8 to 25, |
| M$_2$O/Al$_2$O$_3$ = | 7 to 30, |
| H$_2$O/M$_2$O = | 10 to 14, and |
| TMA/SiO$_2$ = | 0.05 to 0.25, | wherein M is an alkali metal cation and TMA is a tetramethylammonium ion;
   d. adding said transparent liquid phase substance to a starting mixture containing a silica source, an alumina source, and an alkali source to form a mixture comprising the following oxide molar ratios:

| | |
|---|---|
| TMA/SiO$_2$ = | 0.02 to 0.04, |
| SiO$_2$/Al$_2$O$_3$ = | 5 to 30, |
| M$_2$O/Al$_2$O$_3$ = | 0.5 to 10, |
| H$_2$O/SiO$_2$ = | 10 to 40, and | e. crystallizing said mixture in d. at a temperature of from 90 to 140° C.

2. A process according to claim 1, wherein said starting mixture of an aqueous solution of an alkali metal silicate as the silica source and an aluminum containing aqueous solution as the alumina source are simultaneously and continuously supplied to a reaction zone in substantially the same ratio, wherein a homogeneous compound of an amorphous aluminosilicate is prepared.

3. A process according to claim 1, wherein the transparent liquid phase substance is obtained by mixing the aqueous solution of an alkali metal aluminate, the aqueous solution of an alkali metal hydroxide and the tetramethylammonium compound; and then mixing the aqueous solution of an alkali metal silicate with the thus-obtained mixture.

* * * * *